US012126509B2

United States Patent
Uzawa et al.

(10) Patent No.: US 12,126,509 B2
(45) Date of Patent: Oct. 22, 2024

(54) PACKET CAPTURE DEVICE, TIME STAMP AMENDMENT METHOD, PACKET CAPTURE METHOD AND PACKET CAPTURE PROGRAM

(71) Applicant: Nippon Telegraph and Telephone Corporation, Tokyo (JP)

(72) Inventors: Hiroyuki Uzawa, Tokyo (JP); Saki Hatta, Tokyo (JP); Shuhei Yoshida, Tokyo (JP); Koyo Nitta, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/256,411

(22) PCT Filed: Dec. 9, 2020

(86) PCT No.: PCT/JP2020/045812
§ 371 (c)(1),
(2) Date: Jun. 7, 2023

(87) PCT Pub. No.: WO2022/123677
PCT Pub. Date: Jun. 16, 2022

(65) Prior Publication Data
US 2024/0048466 A1 Feb. 8, 2024

(51) Int. Cl.
*H04L 43/106* (2022.01)
*H04L 43/067* (2022.01)
*H04L 69/28* (2022.01)

(52) U.S. Cl.
CPC .......... *H04L 43/067* (2013.01); *H04L 43/106* (2013.01); *H04L 69/28* (2013.01)

(58) Field of Classification Search
CPC ..... H04L 43/067; H04L 43/106; H04L 69/28; Y02D 30/50
See application file for complete search history.

(56) References Cited

U.S. PATENT DOCUMENTS

| 2002/0065940 A1* | 5/2002 | Suzuki | H04L 9/40 |
| | | | 709/248 |
| 2004/0062278 A1* | 4/2004 | Hadzic | H03L 7/085 |
| | | | 370/503 |

(Continued)

FOREIGN PATENT DOCUMENTS

| CA | 2944018 C | * | 1/2019 | ........... H04N 21/231 |
| GB | 2586175 A | * | 2/2021 | ........... G01S 19/256 |

(Continued)

OTHER PUBLICATIONS

Fmadio, "10G Packet Capture", https://fmad.io/jp.index.html, 6 pages, As discussed in the specification 2023.

*Primary Examiner* — Alina A Boutah
(74) *Attorney, Agent, or Firm* — Slater Matsil, LLP

(57) ABSTRACT

An embodiment is a packet capture device including a first local timer synchronized with an external global timer, a second local timer, a time stamp assign unit for assigning a time stamp to a inputted packet signal based on the second local timer, a filter unit for selecting the packet signal to which the time stamp is assigned, a capture file generation unit for receiving the selected packet signal, and a storage unit for storing a capture file generated in the capture file generation unit, wherein the capture file generation unit calculate a difference between a timer value of the first local timer and a timer value of the second local timer to correct the time stamp value on the basis of the difference.

12 Claims, 10 Drawing Sheets

(56) References Cited

U.S. PATENT DOCUMENTS

| | | | | |
|---|---|---|---|---|
| 2006/0195455 A1* | 8/2006 | Shah | ............... | H04L 43/0864 |
| 2014/0013008 A1* | 1/2014 | Lazarus | ............... | H04L 69/28 |
| | | | | 709/248 |
| 2016/0182319 A1* | 6/2016 | Martin | ............... | H04L 63/0823 |
| | | | | 370/241 |
| 2019/0056972 A1* | 2/2019 | Zhou | ............... | G06F 11/30 |
| 2020/0028666 A1* | 1/2020 | Goldin | ............... | H04J 3/0644 |
| 2020/0304224 A1* | 9/2020 | Neugeboren | ............... | H04L 43/0858 |

FOREIGN PATENT DOCUMENTS

| | | | | |
|---|---|---|---|---|
| JP | H05274057 A | 10/1993 | | |
| JP | 2004254258 A * | 9/2004 | ........... | H04L 1/0002 |
| JP | 2011250364 A * | 12/2011 | | |
| JP | 5053918 B2 | 10/2012 | | |
| WO | WO-2015116980 A1 * | 8/2015 | ............ | H04J 3/0664 |
| WO | WO-2017155545 A1 * | 9/2017 | ............. | G06F 11/30 |

* cited by examiner

PACKET CAPTURE DEVICE, TIME STAMP AMENDMENT METHOD, PACKET CAPTURE METHOD AND PACKET CAPTURE PROGRAM

CROSS-REFERENCE TO RELATED APPLICATIONS

This application is a national phase entry of PCT Application No. PCT/JP2020/045812, filed on Dec. 9, 2020, which application is hereby incorporated herein by reference.

TECHNICAL FIELD

Embodiments of the present invention relates to a packet capture device, a time stamp correction method, a packet capture method, and a packet capture program for correcting a time stamp.

BACKGROUND

With the progress of virtualization technology in NFV (Network Function Virtualization)/SDN (Software Defined Networking), various services using VM (Virtual Machine) and the like are provided. A packet capture device capable of selectively capturing a packet of a specific flow is one of devices essential for quality/failure analysis at the time of service provision. Here, the specific flow is an aggregation of packets having the same rule for a combination of MAC address and IP address of the transmission source and destination and the like.

In the packet capture device, a time stamp is assigned to each capture packet. The time stamp value represents a time point when a packet is captured by the device, and is assigned based on a local timer included in the device. It is desirable that the local timer is synchronized with a global timer based on NTP server/GPS and the like. For this reason, the packet capture device has conventionally been provided with one local timer and directly corrects the local timer value on the basis of the global timer value notified via a time point synchronization interface (NPL 1).

CITATION LIST

Patent Literature

[PTL 1] Japanese Patent No. 5053918

Non Patent Literature

[NPL 1] fmadio, "10G Packet Capture", https://fmad.io/jp.index.html

SUMMARY

Technical Problem

When the local timer value is directly corrected, if the local timer value is advanced more than the global timer value, the time stamp assigned to the packet inputted immediately before correction indicates future more than the time stamp assigned to the packet inputted immediately after correction, and the time point sequence mismatch occurs. In the failure analysis, packets around a failure occurrence time point are identified from a packet data group recorded in the generated pcap (packet capture) file, depending on a time stamp value, when the mismatch occurs in the same pcap file, an identification is made difficult.

A method of calculating a statistical value of a time difference between the global timer value and the local timer value and correcting the local timer value based on the statistical value is also disclosed (PTL 1). However, even if a correction frequency is lowered, there is no difference in that the local timer value is directly corrected, and it is difficult to prevent the occurrence of the mismatch in the same pcap file.

Solution to Problem

In order to solve the above problem, a packet capture device includes a first local timer synchronized with an external global timer, a second local timer, a time stamp assign unit that assigns a time stamp to an inputted packet signal based on the second local timer, a filter unit that selects a packet signal to which the time stamp is assigned, a capture file generation unit that receives the selected packet signal, and a storage unit that stores a capture file generated by the capture file generation unit, wherein the capture file generation unit calculates a difference between a timer value of the first local timer and a timer value of the second local timer, and corrects a time stamp value on the basis of the difference.

A time stamp correction method is a method for correcting a time stamp value to a packet signal, and includes a step for setting a timer value of a first local timer to a second local timer as an initial value, a step for assigning a time stamp to an inputted packet signal based on a timer value of the second local timer, a step for obtaining the timer value of the first local timer and the timer value of the second local timer, a step for calculating a difference between the time point by the first local timer and the timer value of the second local timer, and a step for correcting a time stamp value assigned to the packet signal on the basis of the difference.

A packet capture program causes a packet capture device including a time stamp assign unit, a filter unit, a capture file generation unit, a first local timer, and a second local timer to perform processing including a step for setting a timer value of the first local timer to the second local timer as an initial value, a step for causing the time stamp assign unit to assign a time stamp to a packet signal based on a timer value of the second local timer, a step for causing the filter unit to select the packet signal to which the time stamp is assigned, a step for causing the capture file generation unit to obtain a timer value of the first local timer and a timer value of the second local timer, a step for calculating a difference between the timer value of the first local timer and the timer value of the second local timer, a step for correcting the time stamp value assigned to the packet signal on the basis of the difference, a step for writing data of capture packet including the corrected time stamp value to a packet capture file, and a step for stamping the timer value of the first local timer in a current capture file generation period to the packet capture file as a generation time point of the packet capture file and causes the packet capture device to function.

Advantageous Effects of Embodiments of the Invention

According to embodiments of the present invention, a time point assigned by a time stamp in a packet capture is corrected to prevent mismatch of the time point.

DETAILED DESCRIPTION OF ILLUSTRATIVE EMBODIMENTS

First Embodiment

A packet capture device according to a first embodiment of the present invention will be described with reference to FIGS. 1 to 3.

<Configuration of Packet Capture Device>

Figure 1:
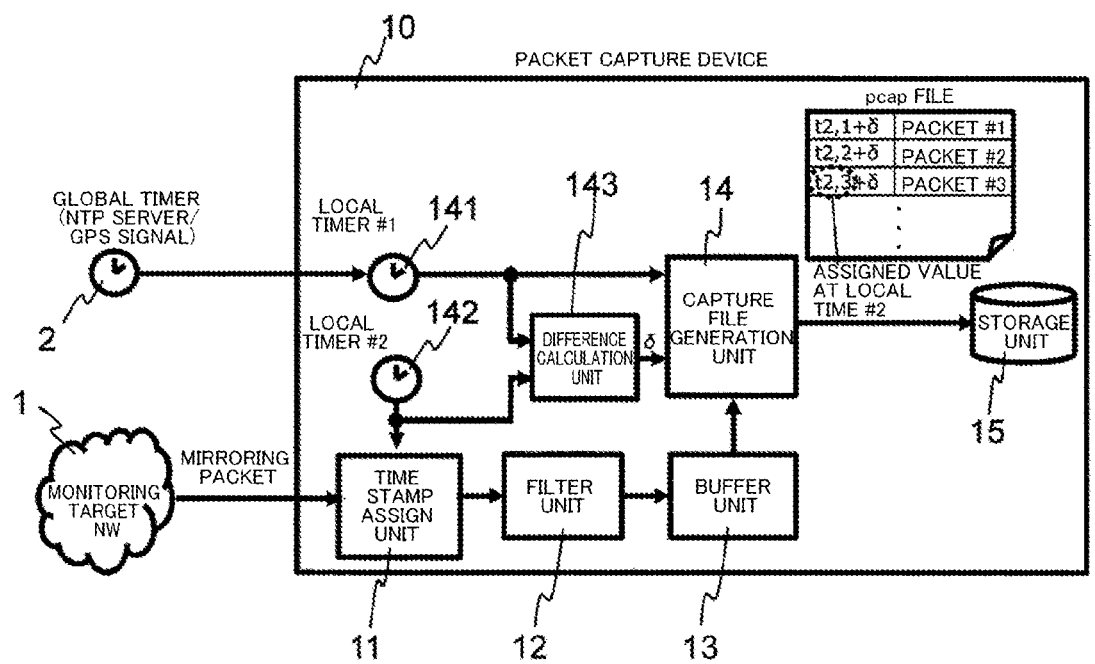
FIG. 1 is a schematic diagram showing a configuration of a packet capture device according to a first embodiment of the present invention.

As shown in FIG. 1, the packet capture device 10 according to the present embodiment includes a time stamp assign unit 11, a filter unit 12, a buffer unit 13, a capture file generation unit 14, and a storage unit 15.

The capture file generation unit 14 includes a first local timer 141, a second local timer 142, and a difference calculation unit 143.

The time stamp assign unit 11 assigns a time stamp to a mirroring packet inputted from a network 1 to be monitored on the basis of the second local timer 142.

The filter unit 12 selects a capture target packet.

The buffer unit 13 buffers the selection packet.

The capture file generation unit 14 makes a buffered packet into a pcap (packet capture) file. A time stamp value is corrected by using a difference acquired by the difference calculation unit 143 for time points (timer values) acquired by the first local timer 141 and the second local timer 142, respectively.

Here, the first local timer 141 periodically acquires a global timer value from a global timer (NTP server/GPS signal) 2 regardless of a start and stop of capture, and corrects the timer value. For example, the first local timer 141 obtains the global timer value once per second.

On the other hand, when a capture start trigger is inputted from the outside, the second local timer 142 sets the timer value of the first local timer 141 as an initial value of the second local timer 142, thereafter, self-operates.

In the packet capture device 10 according to the present embodiment, two local timers are provided, and functions are divided into the first local timer 141 for synchronizing with the global timer 2 and the second local timer 42 for assigning the time stamp to the packet. At the time of arrival of the packet, the time stamp is assigned by the second local timer 142, and at the time of generating the pcap file, the assigned time stamp value is uniformly corrected from the difference between the time points (the timer values) acquired by the first local timer 141 and the second local timer 142, respectively. Thus, it is possible to suppress a mismatch of the time point in the pcap file while synchronizing with the global timer 2.

<Packet Capture Method>

A detail of time stamp correction method according to the present embodiment will be described with reference to FIGS. 2A to 3.

In the packet capture device 10 according to the present embodiment, time point information is acquired by the first local timer 141 from the global timer 2.

The capture start trigger signal from the outside is inputted to the time stamp assign unit 11, the filter unit 12, the buffer unit 13, the capture file generation unit 14, and the second local timer 142. In FIG. 3, in order to understand easily and visually, arrows indicating input of the capture start trigger signal to each unit are shown not to overlap each other, but actually, simultaneously input is performed. Alternatively, the data may be input with a slight time difference.

Figure 2A:
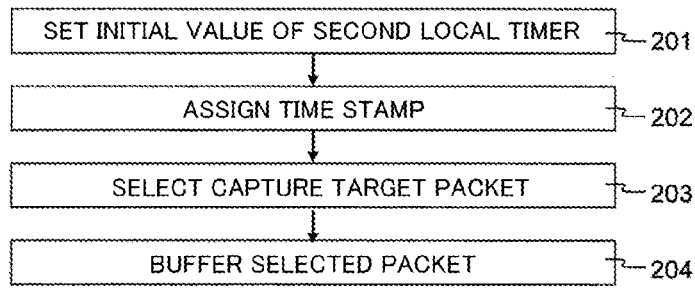
FIG. 2A is a flowchart diagram for explaining a packet capture method according to the first embodiment of the present invention.
Figure 3:
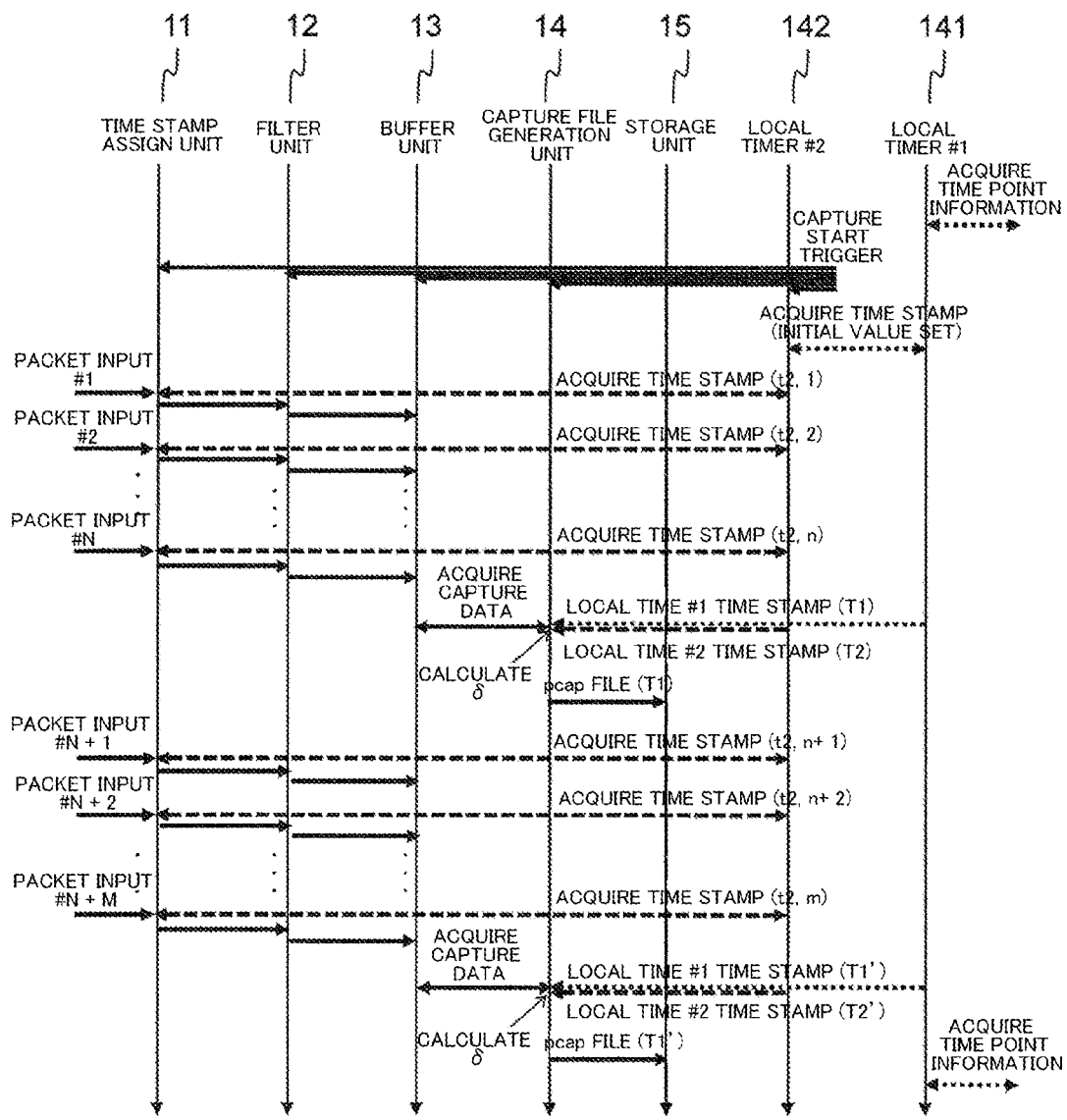
FIG. 3 is a sequence diagram for explaining the packet capture method according to the first embodiment of the present invention.

FIG. 2A shows a flowchart diagram of sequential processing for each packet input. First, the second local timer 142 sets the timer value of the first local timer 141 as the initial value (step 201). Thereafter, the second local timer 142 self-operates.

Next, when the mirroring packet is inputted from the monitoring target network (NW) 1 to the time stamp assign unit 11, the time stamp is assigned on the basis of the value of the second local timer 142 (step 202). For example, the time stamps (t2, 1), (t2, 2), ..., (t2, N) are assigned to the packet #1, the packet #2, ..., the packet #N which are sequentially inputted. Here, "t2" indicates that the value (the timer value) of the second local timer 142, and "1", "2", ..., "N" indicates the first packet (the packet #1), the second packet (the packet #2), ..., the N-th packet (the packet #N).

Next, the filter unit 12 selects the packet to be captured (step 203). Here, the selection in the filter unit 12 is processing for selecting the packet matching a list of flows to be captured. For this purpose, the filter unit 12 includes the list, and when the packet is inputted, identifies the flow of the packet, collates the flow with each flow recorded in the list, and the packet whose coincidence is determined is passed through, and the packet whose coincidence is not determined is discarded.

Next, the selected packet is buffered in the buffer unit 13, and capture data is acquired (step 204).

Figure 2B:
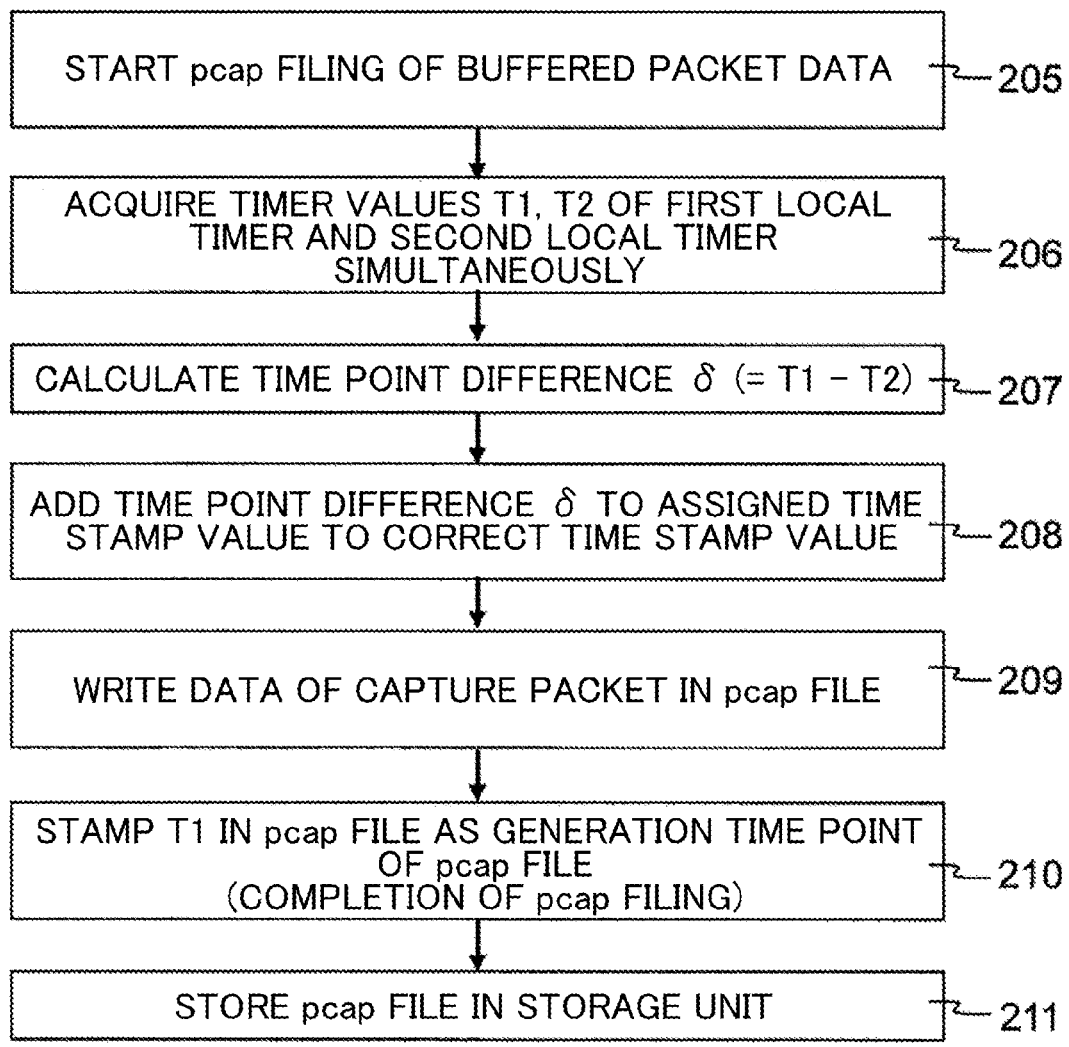
FIG. 2B is a flowchart diagram for explaining a packet capture method according to the first embodiment of the present invention.

FIG. 2B is a flowchart diagram of processing by trigger under a predetermined condition. First, when the amount of buffered packet data reaches a predetermined data amount or when a predetermined time has elapsed, the capture file generation unit 14 starts the pcap filing of the buffered packet data (step 205). For example, the data of the buffered packet #1 to #N is started to be converted into the pcap file.

At this time, the capture file generation unit 14 corrects the time stamp value as follows. First, each timer value of T1 and T2 of the first local timer 141 and the second local timer 142 are simultaneously acquired (step 206), and the difference calculation unit 143 calculates the time point difference δ (=T1−T2) (step 207). In FIG. 3, in order to understand easily and visually, although the arrows (the dotted line) from the first local timer 141 and the second local timer 142 to the capture file generation unit 14 are shown so as not to overlap each other, respectively, but they are actually inputted simultaneously. Alternatively, the data may be input with a slight time difference.

Next, the time point difference δ is added to the assigned time stamp value to each buffered packet, for example, the packet #1 to #N to correct the time stamp value (step 208).

Next, the data of the capture packet including the corrected time stamp is written in the pcap file (step 209).

When the writing to all the packets to be filed is completed, the pcap file is stamped with T1 as the generation time point of the pcap file, and the pcap file is completed (step 210).

Finally, the storage unit 15 (for example, a hard disk) stores the pcap file (step 211).

Hereinafter, the period from the packet input to the completion of the pcap filing and storing in the storage unit 15 is referred to as "the capture file generation period".

Thereafter, similar correction is performed for the packet which are continuously inputted (for example, the packet #N+1 and later), and the PCAP filing is performed.

In the packet capture device 10 according to the present embodiment includes, for example, the time stamp assign unit 11, the filter unit 12, the buffer unit 13, and the second local timer 142 are configured as hardware, the capture file generation unit 14 is configured as a general-purpose processor, and the first local timer 141 is configured as a time point source in the general-purpose processor, thereby efficiently configuring the packet capture device 10.

Second Embodiment

A packet capture device 20 and a method according to a second embodiment of the present invention will be described.

The packet capture device 20 and the method according to the present embodiment are substantially the same as those of the first embodiment, but are different from the first embodiment in that they have a function of skipping correction of the time stamp value.

The configuration of the packet capture device 20 is the same as that of the first embodiment.

In the packet capture method according to the present embodiment, when the time point difference δ is sufficiently small, the time stamp value need not be corrected.

Specifically, in the packet capture method, the sequential processing (steps 301 to 304) for each packet input are the same as those of the first embodiment (steps 201 to 204).

Figure 4:
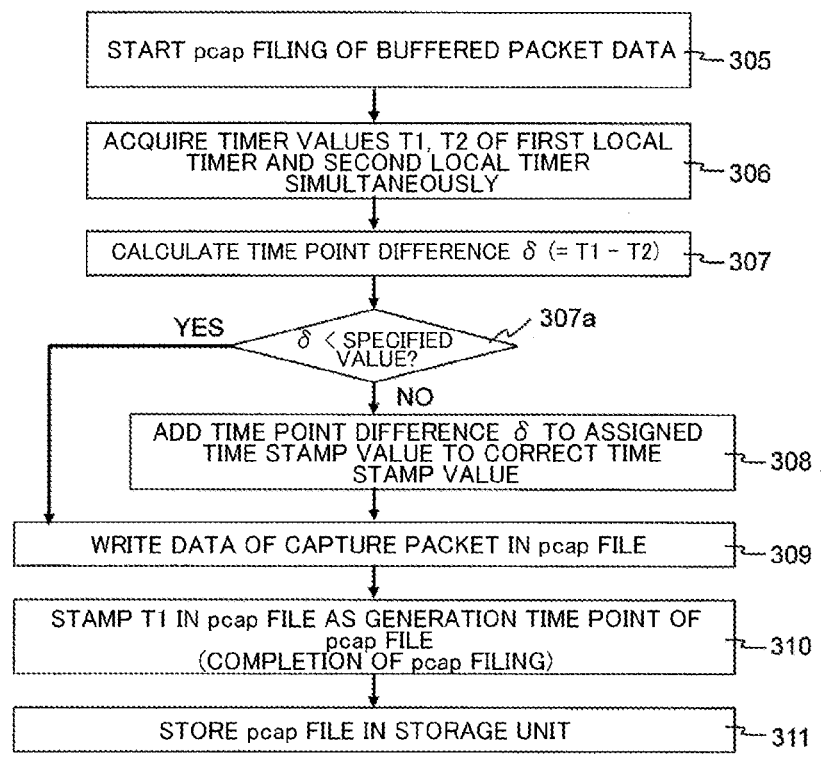
FIG. 4 is a flowchart diagram for explaining a packet capture method according to a second embodiment of the present invention.

In the processing by the trigger under the predetermined condition shown in FIG. 4, steps 305 to 307 are the same as those of the first embodiment (steps 205 to 207). After calculating the time point difference δ (step 307), it is determined whether or not δ is less than a predetermined specified value (step 307a).

When the value δ is less than the specified value, correcting the time stamp value (step 308) is skipped and data of the capture packet is written in the pcap file (step 309).

When the value δ is equal to or larger than the specified value, the time stamp value is corrected (step 308) and the data of the capture packet is written in the pcap file (step 309).

After the step 309, the flow is the same as that described in the first embodiment.

Thus, processing for δ addition in the capture file generation unit is reduced, and a processing load can be reduced.

Third Embodiment

A packet capture device and a method according to a third embodiment of the present invention will be described.

Although the packet capture device 30 and method according to the present embodiment are substantially the same as those of the first embodiment, the correction of the time stamp value is different.

The configuration of the packet capture device 30 is the same as that of the first embodiment.

In the packet capture method according to the present embodiment, a time average value of the time point difference δ is used in place of the time point difference δ (T1−T2) for the correction of the time stamp value. Here, the timing for acquiring 6 is the same as that in the first embodiment.

Specifically, in the packet capture method, the sequential processing (steps 401 to 404) for each packet input are the same as those of the first embodiment (steps 201 to 204).

Figure 5:
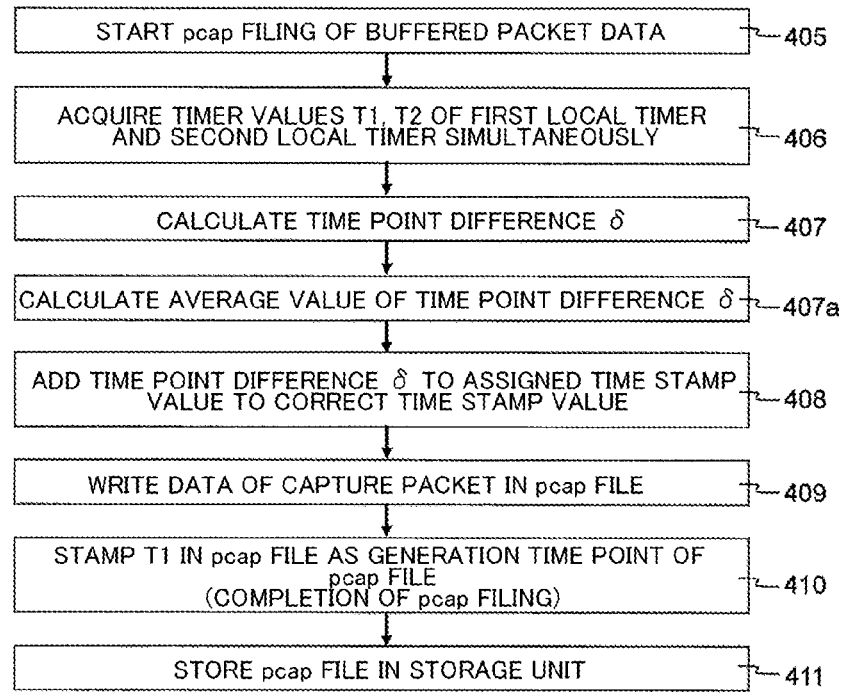
FIG. 5 is a flowchart diagram for explaining a packet capture method according to a third embodiment of the present invention.

In the processing by the trigger under the predetermined condition shown in FIG. 5, steps 405 to 407 are the same as those of the first embodiment (steps 205 to 207). After calculating the time point difference δ (step 407), and the time average value of δ calculated for each capture file generation period is calculated (step 407a). For example, a moving average of δ is calculated.

After the step 408, the flow is the same as that described in the first embodiment.

Thus, the time fluctuation of the pcap file generation timing can be suppressed.

Fourth Embodiment

A packet capture device and a method according to a fourth embodiment of the present invention will be described.

Although the packet capture device 40 and method according to the present embodiment are substantially the same as those of the first embodiment, the correction of the time stamp value is different.

The configuration of the packet capture device 40 is the same as that of the first embodiment.

In the correction of the time stamp value in this embodiment, during the capture operation, the time stamp value of each packet in the current capture file generation period is corrected by linear interpolation from the δ value (the δprev) calculated in the immediately before capture file generation period and the δ value (the δcurrent) calculated in the current capture file generation period.

Specifically, in the packet capture method, the sequential processing (steps 501 to 504) for each packet input are the same as those of the first embodiment (steps 201 to 204).

Figure 6:
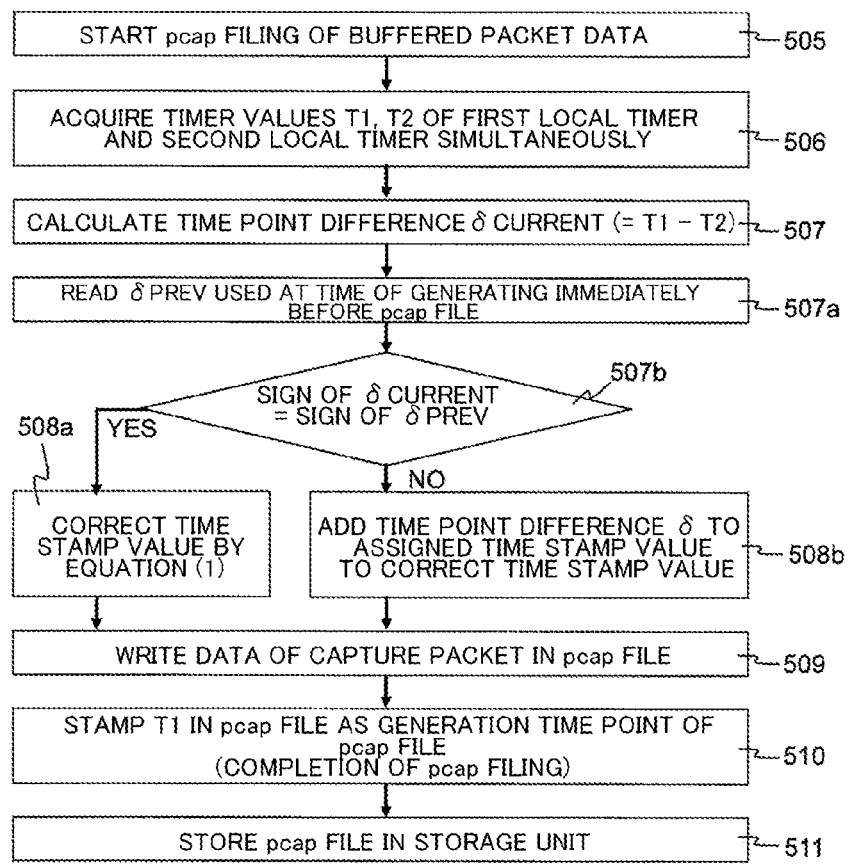
FIG. 6 is a flowchart diagram for explaining a packet capture method according to a fourth embodiment of the present invention.

In the processing by the trigger under the predetermined condition shown in FIG. 6, steps 505 to 507 are the same as those of the first embodiment (steps 205 to 207). During the capture operation, the capture file generation unit holds 67prev and T1 value (T1, prev) calculated in the immediately before capture file generation period.

After calculating the time point difference δ (step 507), the δ value (the current) and the T1 value (T1, current) at the current time point on the timing of generating the pcap file are acquired (step 507a).

Next, it is determined whether or not the signs of δprev and δcurrent are the same (step 507b).

When the signs of δprev and δcurrent are the same, tmod is calculated from the equation (1) by linear interpolation with the time stamp value before correction as t and the time stamp value after correction as tmod (step 508a).

[Math. 1]

$$tmod = t + \frac{(\delta current - \delta prev)}{(T1, current - T1, prev)} t \quad (1)$$

When the signs of δprev and δcurrent are different from each other, δcurrent is added to t to correct the time stamp value, similarly to the first embodiment (step 508b). Note that the initial value of δprev is 0, and the initial value of T1 value (T1, prev) calculated in the immediately before capture file generation period is the capture start time point.

Next, the capture file generation unit writes the data of the capture packet including the corrected time stamp value into the pcap file (step 509). Thereafter, the flow is the same as that described in the first embodiment.

First Example

A packet capture device and a method according to a first example of the present invention will be described. As a packet capture device and method according to the present embodiment, the packet capture device 10 and method according to the first embodiment are used.

In the present embodiment, it is assumed that a packet #1 is inputted at 13 hours 10 minutes 20 seconds 30 milliseconds (13:10:20.030), a packet #2 is inputted after 10 milliseconds, and a time point (a timer value) in the second local timer 142 is advanced by 20 milliseconds from a time point (a timer value) of the global timer 2 (the first local timer 141).

Figure 7A:
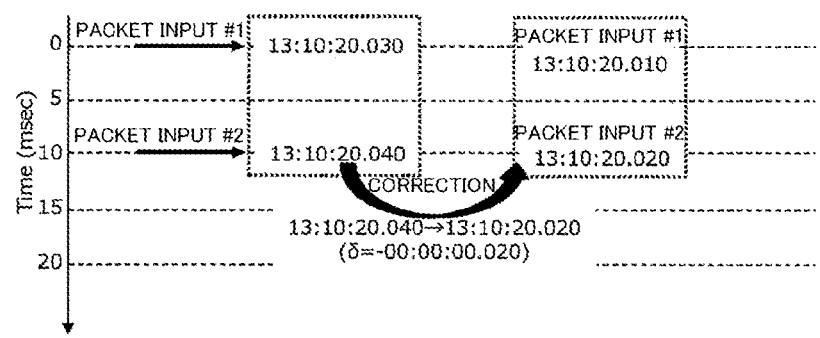
FIG. 7A is a diagram for explaining an operation of the packet capture device and method according to the first embodiment of the present invention.

In the packet capture device and method according to the present embodiment, as shown in FIG. 7A, the packet #1 is first inputted, and the time of 13:10:20.030 is assigned by the second local timer 142, and is buffered in the buffer unit 13 via the filter unit 12.

Next, the packet #2 is inputted, and similarly, the time of 13:10:20.040 is assigned by the second local timer 142, and is buffered in the buffer unit 13 via the filter unit 12.

Next, the capture file generation unit calculates the difference (−20 milliseconds) between the time point (the timer value) of the first local timer 141 (13:10:20.030) and the time point (the timer value) of the second local timer 142 (13:10:20.040), adds to the input time points of the packets #1 and #2, respectively, and the time stamp values of the packets #1 and #2 are corrected to 13:10:20.010, 13:10:20.020, respectively.

Figure 7B:
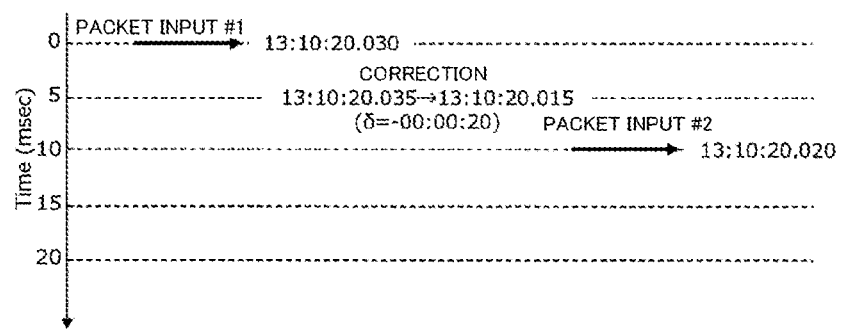
FIG. 7B is a diagram for explaining an operation of a conventional packet capture device and method.

On the other hand, in the conventional packet capture device and method, as shown in FIG. 7B, first, the packet #1 is inputted at 13:10:20.030. When the correction of −20 milliseconds is performed after the input of the packet #1, the time stamp of 13:10:20.020 is assigned to the packet #2 inputted after 10 milliseconds of the packet #1. In this way, the time point (the time stamp value) to which the time stamp is assigned is reversed between the packet #1 and the packet #2, and the mismatch of the time point order occurs.

As described above, by using the packet capture device and method according to the present embodiment, the time stamp value can be corrected at the time point when the time stamp is assigned to the inputted packet without causing the mismatch of the time point order.

Figure 8:
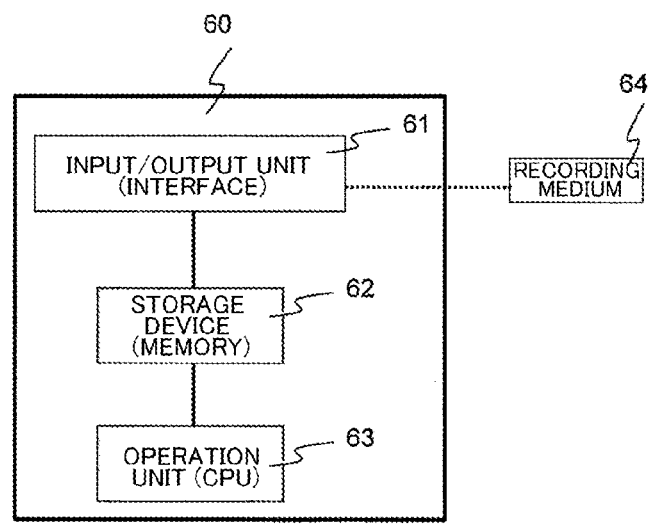
FIG. 8 is a diagram showing a configuration example of a computer according to embodiments of the present invention.

FIG. 8 shows a configuration example of a computer in the packet capture device according to embodiments of the present invention. The packet capture device can be implemented by a computer 60 that includes a CPU (Central Processing Unit) 63, a storage device (a storage unit) 62, and an interface device 61, and a program that controls these hardware resources. Here, for example, the buffer unit 13 and the second local timer 142 are connected to the interface device 61. The CPU 63 executes processing described in the embodiments of the present invention in accordance with a packet capture program stored in the storage unit 62. Thus, the packet capture program causes the packet capture device to function.

In the packet capture device according to the embodiments of the present invention, the computer may be provided inside the device, or at least part of the functions of the computer may be implemented by using an external computer. A time point source in the CPU 63 may be used as the first local timer 141. Also, the storage unit may also use a storage medium 64 that is external to the device, and the packet capture program stored in the storage medium 64 may be read and executed. Examples of the storage medium 64 include various magnetic recording media, a magneto-optic recording medium, a CD-ROM, a CD-R, and various memories. Also, the packet capture device program may be supplied to the computer via a communication line such as the Internet.

Although the packet capture device according to the present embodiment has shown an example including the buffer unit, but the present invention is not limited thereto. It is also possible to store packets in the storage unit sequentially by buffering the packets without providing the buffer unit, and to read and correct the packets from the storage unit when generating the capture file to make the pcap file.

Although the present embodiment has shown an example in which the mirroring packet is inputted, but the present invention can be applied to other packet signals. For example, an optically copied packet signal may be used.

Although the examples of structure, dimensions, materials, and the like of each constituent part for the configuration and manufacturing method of the particle selection device have been shown in the present embodiments, the present invention is not limited to them. The particle selection device may be any one which exhibits the functions of the particle selection device and exhibits the effects.

INDUSTRIAL APPLICABILITY

Embodiments of the present invention relates to a packet capture device and method, and can be applied to a communication system.

REFERENCE SIGNS LIST

10 Packet capture device
11 Time stamp assign unit
12 Filter unit
13 Buffer unit
14 Capture file generation unit
141 First local timer
142 Second local timer
143 Difference calculation unit
15 Storage unit

The invention claimed is:

1. A packet capture device comprising:
   a first local timer configured to be synchronized with an external global timer;
   a second local timer;
   a time stamp assign circuit configured to assign a time stamp to an inputted packet signal based on the second local timer;
   a filter circuit configured to select a packet signal to which the time stamp is assigned;
   a difference calculation circuit configured to calculate a difference between a timer value of the first local timer and a timer value of the second local timer; and
   a capture file generation circuit configured to receive the selected packet signal, and correct a time stamp value in the time stamp assigned to the selected packet signal on the basis of the difference between the timer value of the first local timer and the timer value of the second local timer.

2. The packet capture device of claim 1, wherein the capture file generation circuit is configured to compare the difference with a predetermined specified value, wherein when the difference is equal to or larger than the predetermined specified value, the time stamp value assigned to the packet signal is corrected on the basis of the difference.

3. The packet capture device of claim 1, wherein the capture file generation circuit is configured to add the difference to the time stamp value to correct the time stamp value.

4. The packet capture device of claim 1, wherein the capture file generation circuit is configured to:
   calculate a time average value of the differences for a current capture file generation period, wherein correcting a time stamp value includes adding the time average value of the differences to the time stamp value.

5. The packet capture device of claim 1, wherein the capture file generation circuit is configured to correct the time stamp value according to $$t\text{mod} = t + \frac{(\delta\text{current} - \delta\text{prev})}{(T1, \text{current} - T1, \text{prev})} t \quad (1)$$

where, tmod is a time stamp value after correction, t is a time stamp value before correction, δprev and δcurrent are the differences calculated in the immediately before and current capture file generation periods, T1, prev and T1, current indicate timer values of the first local timer in the immediately preceding and current capture file generation periods, respectively.

6. A packet capture method comprising:
   setting a timer value of a first local timer to a second local timer as an initial value;
   assigning a time stamp to an inputted packet signal based on a timer value of the second local timer;
   obtaining the timer value of the first local timer and the timer value of the second local timer;
   calculating a difference between the time point by the first local timer and the timer value of the second local timer; and
   correcting a time stamp value in the time stamp assigned to the inputted packet signal on the basis of the difference between the time point by the first local timer and the timer value of the second local timer.

7. The packet capture method of claim 6, further including:
   comparing the difference with a predetermined specified value, wherein when the difference is equal to or larger than the predetermined specified value, the time stamp value to the packet signal is corrected on the basis of the difference.

8. The packet capture method of claim 6, wherein correcting a time stamp value includes adding the difference to the time stamp value.

9. The packet capture method of claim 6, further including:
   calculating a time average value of the differences for a current capture file generation period, wherein correcting a time stamp value includes adding the time average value of the differences to the time stamp value.

10. The packet capture method of claim 6, wherein the time stamp value is corrected according to $$t\text{mod} = t + \frac{(\delta\text{current} - \delta\text{prev})}{(T1, \text{current} - T1, \text{prev})} t \quad (1)$$

where, tmod is a time stamp value after correction, t is a time stamp value before correction, δprev and δcurrent are the differences calculated in the immediately before and current capture file generation periods, T1, prev and T1, current indicate timer values of the first local timer in the immediately preceding and current capture file generation periods, respectively.

11. The packet capture method of claim 6, further comprising:
    selecting the packet signal to which the time stamp is assigned;
    writing data of the capture packet including the corrected time stamp value into the packet capture file; and
    stamping the timer value of the first local timer in the packet capture file as the generation time point of the packet capture file.

12. A non-transitory computer readable storage medium storing a packet capture program for causing a packet capture device including a time stamp assign circuit, a filter circuit, a difference calculation circuit, a capture file generation circuit, a first local timer, and a second local timer, to perform processing including:
    setting a timer value of the first local timer to the second local timer as an initial value;
    causing the time stamp assign circuit to assign a time stamp to a packet signal based on a timer value of the second local timer;
    causing the filter circuit to select the packet signal to which the time stamp is assigned;
    causing the difference calculation circuit to obtain a timer value of the first local timer and a timer value of the second local timer, and calculate a difference between the timer value of the first local timer and the timer value of the second local timer;
    causing the capture file generation circuit to correct the time stamp value assigned to the packet signal on the basis of the difference between the timer value of the first local timer and the timer value of the second local timer;
    writing data of capture packet including the corrected time stamp value to a packet capture file; and
    stamping the timer value of the first local timer in a current capture file generation period to the packet capture file as a generation time point of the packet capture file.

* * * * *